3,669,794
EXTRUSION COATING OF A HEAT FUSIBLE FOAM SHEET

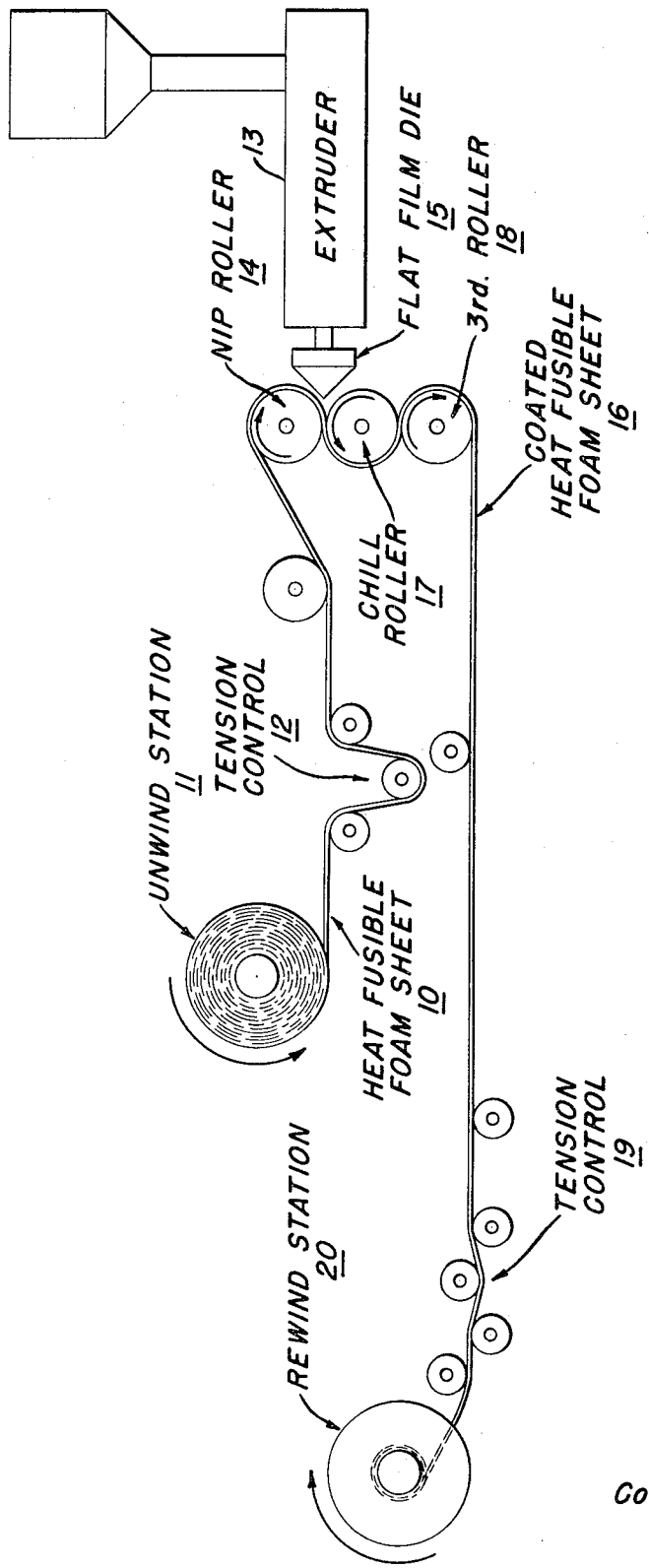

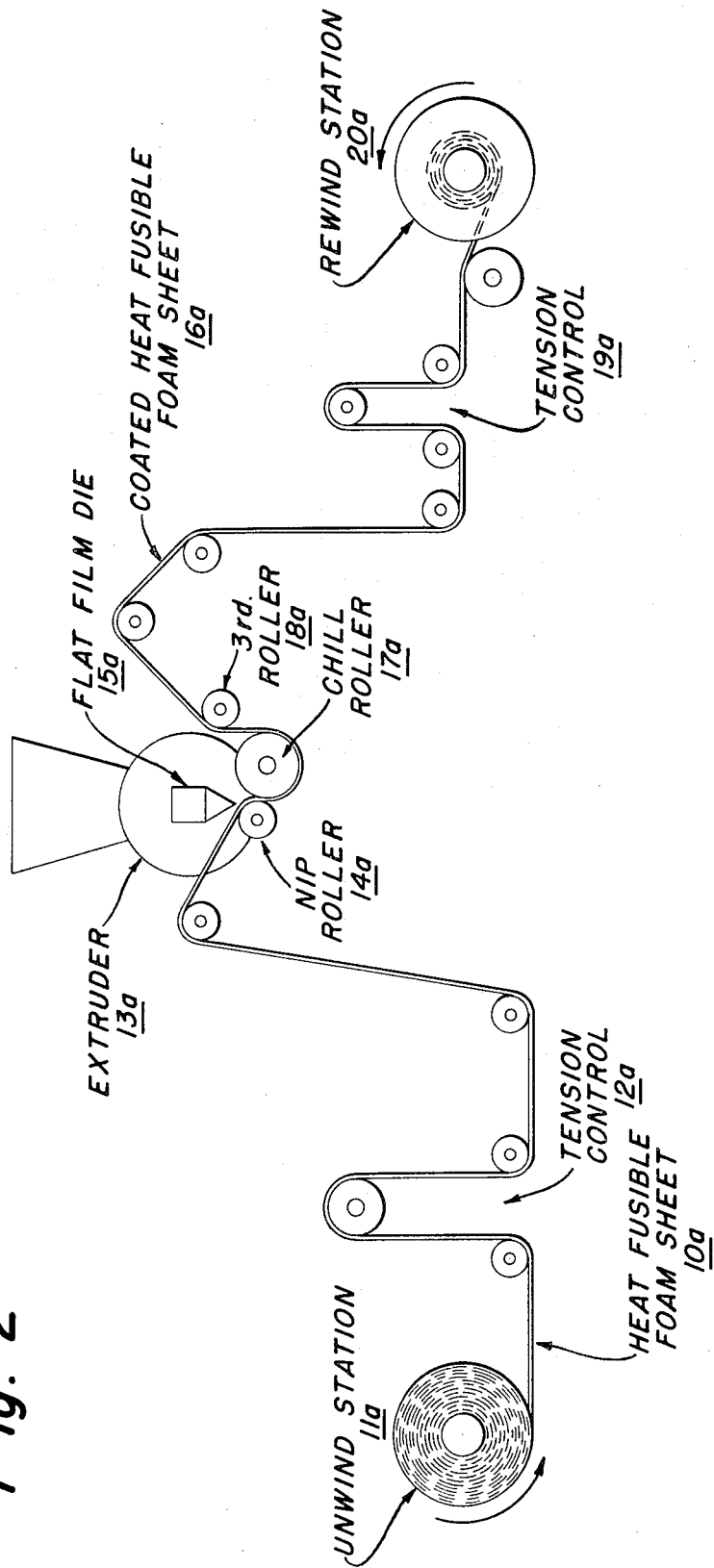

Conrad F. Mazur, Chippewa Falls, Wis., assignor to Standard Oil Company, Chicago, Ill.
Filed Jan. 15, 1969, Ser. No. 791,393
Int. Cl. B29c 19/00
U.S. Cl. 156—244                        15 Claims

ABSTRACT OF THE DISCLOSURE

A process for continuously coating a polystyrene foam sheet with a resinous polymeric material comprising: (1) melting said resinous polymeric material, (2) extruding said resinous polymeric material through a flat film die, (3) contacting the molten resinous polymeric material with the heat fusible foam sheet and, (4) compressing the sheet and resinous material to form a laminate product.

BACKGROUND OF THE INVENTION

In the early stages of developing extruded polystyrene foam sheet it appeared that, if properties of high gloss and high strength could be imparted to one surface of the sheet, dishes and the like could be thermally formed and trimmed from the sheet having a desirable china-like surface. It was found that coating the polystyrene foam with a resinous polymeric material would provide the desired strength and gloss properties. The physical properties of the product of coating polystyrene foam sheet with resinous polymeric materials are superior to the properties of either the polystyrene foam sheet or the resinous polymeric material alone. The gloss, rigidity, abrasion resistance and cut resistance of extruded foam polystyrene sheet are substantially improved with a resinous polymeric material coating, and conversely, a resinous polymeric material film is substantially improved in its insulative properties, rigidity and toughness when combined with an extruded foam polystyrene substrate in a product having a white appearance.

SUMMARY OF THE INVENTION

The invention is a continuous process for coating polystyrene foam sheet with a polymeric resinous material. The process includes heating the resinous material in an extruder, such extruder being any of those types in common use in the plastics industry, having a heating means and a compression means. Resinous polymeric material is melted in an extruder whereupon it is forced out of the barrel and through a flat film die under a pressure in the range of about 1,000 and 5,000 pounds per square inch. As used in the specification and claims the term melted means plasticized by heat until extrudable. The flat film die desirably has a gap or opening of from 2 to 100 thousandths of an inch and an effective width approximately equal to the width of the polystyrene foam sheet to be coated. The die can be provided with conventional heating means.

The molten resinous polymeric material is continuously extruded through the die and onto the polystyrene foam layer which should be moving past the die. The coated polystyrene foam is then compressed between two rollers, a nip roller and a chill roller. The nip roller is preferably heated to between 100° and 200° F. and the chill roller is preferably cooled to between 40° and 80° F. The temperature of the rollers should be controlled so that the polymeric resin material does not cool so much that it cannot melt a thin layer of the foam polystyrene and fuse thereto. The clearance between these two rollers, which causes the coated polystyrene foam laminate to be compressed is commonly referred to as the nip. In the practice of this invention the nip pressure per linear inch must be adequate to press the coating into the foam substrate. Such a nip pressure is that generally sufficient to compress the coated foam sheet to about ½ its normal thickness. The foam, being resilient, regains a majority of its original thickness after being compressed. After compression the laminate is held in contact with the chill roller which cools it and which can also impart desirable surface characteristics to the polymeric resinous layer. For example, if a mirror surface is desired a highly polished chill roller should be used.

The polymeric resinous materials useful in practicing my invention are preferably, acrylonitrile-butadiene-styrene polymers, polyvinylchloride, crystalline polystyrene, rubber modified polystyrene, acrylonitrile polystyrene, polypropylene, polyethylene and the like. The temperature of the polymer leaving the die should be about 450° F. since at this temperature it will remain hot long enough to melt a thin layer of the polystyrene foam sheet, thus enabling it to adhere thereto.

The laminate product of this invention can be used for panels in homes, buildings, truck trailers and mobile homes. It can be used for dishes and packaging containers. It can also be used as a material of construction for such things as refrigerators, ice chests and even toys and recreational equipment.

DESCRIPTION OF THE DRAWINGS

The drawings show two of a number of possible modes of practice of the invention. FIG. 1 shows a horizontal extruder 13 for extruding polymeric resinous material onto a heat fusible foam sheet; FIG. 2 shows a vertical extruder 13a. In FIG. 1 the heat fusible foam sheet 1 travels from an unwind station 11 through a tension control 12 and onto a nip roller 14, which is a roller that forms a nip or compression means with a second roller, The heat fusible foam sheet 10 is then coated with a polymeric resinous material extruded through a flat film die 15 attached to extruder 13. The coated sheet 16 is then transferred to a chill roller 17 which is a cooled roller opposite the nip roller which forms a part of the compression means and also imparts desirable surface characteristics to the coating. The coated heat fusible foam sheet 16 is next transferred to a third roller 18 which enables it to remain in contact with the chill roller 17 for about one-half of its circumference. The coated side having been immediately coated does not contact the surface of the third roller 18. The three rollers referred to above are externally powered to impart motion to the heat fusible foam sheet 10. The coated sheet 16 is then passed through another tension control 19 and wound upon a rewind roll at the rewind station 20. The rewind roller at the rewind station 20 is also powered by an external power source to impart motion to the coated heat fusible foam sheet 16 to wind the finished product.

In FIG. 2 the heat fusible foam sheet 10a travels from an unwind station 11a through a tension control 12a and onto a nip roller 14a, which is a roller that forms a nip or compression means with a second roller. The heat fusible foam sheet 10a is then coated with a polymeric resinous material extruded through a flat film die 15a attached to extruder 13a. The coated sheet is then transferred to a chill roller 17a which is a cooled roller opposite the nip roller which forms a part of the compression means and also imparts desirable surface characteristics to the coating. The coated heat fusible foam sheet 16a is next transferred to a third roller 18a which enables it to remain in contact with the chill roller 17a for about one-half of its circumference. The coated side having been immediately coated does not contact the surface of the third roller 18a. The three rollers referred to above are externally powered to impart motion to the heat fusible foam sheet 10a. The coated sheet 16a is then passed through another tension control 19a and wound upon a rewind roll at the rewind station 20a. The rewind roll at the rewind station 20a is also powered by an external power source to impart motion to the coated heat fusible foam sheet 16a to wind the finished product.

PREFERRED EMBODIMENTS

The preferred extruder has a barrel, a heating means and a compression means. The compression means of the extruder is an auger contained inside the barrel having from 18 to 30 flights (revolutions of the helical inclined plane along the length of the barrel). The heating means is either an electric or oil heater positioned outside and along the barrel to create independently controlled heat zones inside the barrel. Some heat is also provided by working of the material in the auger compression means. The barrel temperature should be between 400° and 475° F., the barrel having an inside diameter of between 1 and 12½ inches. The polymeric resinous material can thus be extruded in a continuous operation.

It is preferred that extrusion be through a heated flat film die. The temperature of the die is held between 375° and 500° F. by either an electric or an oil heater. The pressure inside the die will generally fall in the range of 1,000 to 5,000 p.s.i. depending upon the polymeric resinous material used. The die pressure is preferably 1,500 p.s.i. The gap (opening) in the die is approximately 2 to 100 thousandths of an inch, preferably 10 thousandths, with the width of the die varying with the width of the polystyrene foam sheet to be coated.

For best results it is important that the molten resinous coating material contact the polystyrene foam sheet while it is still on the nip roller. Contacting the two materials at this point insures that the resinous polymeric material will contact the foam sheet while it is being held smooth and free from wrinkles. The product will then be free of wrinkles and surface imperfections. It has also been found that rotating the nip roller between 0 and 10% slower (based on the surface speed of the roller) than the chill roller and the third roller between 0 and 10% faster (based on the surface speed of the roller) than the chill roller results in a more smooth and uniform product. It has been found that about 2% variance in speed (based on the surface speed of the roller) is the optimum. In addition, the tension on the polystyrene foam sheet is controlled by two tension controls (shown in the figures). The preferred tension on the coated sheet coming off the rolls is between 2 and 20 pounds per linear inch.

The linear speed of the polystyrene foam sheet as it travels from the unwind station to the rewind station is dependent upon the thickness of the polymeric resinous material to be applied, the output of the polymeric resinous extruder and the capabilities of the unwind station and the rewind station (shown in the figures). Speeds can range from 100 to 2000 feet per minute depending upon these variables.

Various heat fusible foam sheets can serve as the substrate in the coating process of this invention. The following are examples of the more important foams which can be coated: polystyrene, styrene copolymers, polyethylene, polypropylene and polyvinylchloride. It should be noted, however, that polyethylene and polypropylene foam sheets are only effective as substrates when they are being coated with polyethylene and polypropylene respectively. Similarly, polyethylene and polypropylene are only effective as coating materials when polyethylene and polypropylene foam sheets are the respective substrates.

The compression of the polymeric resinous material onto the polystyrene foam sheet substrate may be effected without nip compression by increasing the linear tension of the foam substrate, thereby causing the polymeric material to be compressed slightly as it is wrapped between the nip roll and the foam substrate.

I claim:

1. In a process for continuously coating a heat fusible foam sheet comprising (1) melting a resinous polymeric material; (2) extruding said resinous polymeric material through a flat film die; (3) contacting a heat fusible foam sheet and the resinous polymeric material and; (4) compressing said contacted heat fusible foam sheet and resinous polymeric material in a compression roller means, said compression roller means and rewind roller imparting motion to the heat fusible foam sheet as it travels through said roller means and subsequently onto the rewind roller, the process being further described in that contact of the resinous polymeric material and the heat fusible foam sheet is effected subsequent to said heat fusible foam sheet passing into the roller means wherein a laminate is formed, the compression roller means comprising (1) a nip roller, (2) a chill roller and (3) a third roller; the improvement comprising: operating the nip roller up to 10% slower than the chill roller, based upon the surface speed of the chill roller and the third roller up to 10% faster than the chill roller, based upon the surface speed of the chill roller.

2. The process of claim 1 wherein the nip roller is rotated about 2% slower than the chill roller, based upon the surface speed of the chill roller, and the third roller is rotated about 2% faster than the chill roller, based upon the surface speed of the chill roller.

3. The process of claim 1 wherein the heat fusible foam sheet is polystyrene, styrene copolymers, or polyvinylchloride.

4. The process of claim 1 wherein the resinous polymeric material is acrylonitrile-butadiene styrene, polyvinylchloride, crystalline polystyrene, rubber modified polystyrene or acrylonitrile polystyrene.

5. The process of claim 1 wherein the resinous polymeric material is extruded at a temperature of about 450° F.

6. The process of claim 1 wherein the nip roller is held at a temperature between 100° and 200° F.

7. The process of claim 1 wherein the polymeric resinous material is extruded through a flat film die under pressure of between 1,000 and 5,000 pounds per square inch.

8. The process of claim 1 wherein the polymeric resinous material is extruded through the flat film die under pressure of about 1,500 pounds per square inch.

9. The process of claim 1 wherein the heat fusible foam sheet is polyethylene and the resinous polymeric material is polyethylene.

10. The process of claim 1 wherein the heat fusible foam sheet is polypropylene and the resinous polymeric material is polypropylene.

11. The process of claim 1 wherein the chill roller is maintained at a temperature between 40° and 80° F.

12. The process of claim 1 wherein the surface speed of each of the nip roller, chill roller and third roller is such that combined they impart a linear speed to the heat fusible foam sheet in the range of about 100 to 2,000 feet per minute.

13. The process of claim 1 wherein the tension on the heat fusible foam sheet is controlled by tension controls to between 2 and 20 pounds per linear inch.

14. The process of claim 1 wherein the resinous polymeric material and the heat fusible foam sheet are compressed sufficiently to press the resinous polymeric material into the heat fusible foam sheet.

15. A process for continuously coating a heat fusible foam sheet comprising (1) melting a resinous polymeric material (2) extruding said resinous polymeric material through a flat film die (3) contacting the heat fusible foam sheet and the resinous polymeric material and (4) compressing said contacted heat fusible foam sheet and resinous polymeric material, the process being made continuous by the use of externally powered roller means and an externally powered rewind roller, said roller means and rewind roller imparting motion to the heat fusible foam sheet as it travels through said roller means and subsequently onto the rewind roller, the process being further described in that contact of the heat fusible foam sheet and the resinous polymeric material is effected subsequent to said heat fusible foam sheet passing into said roller means wherein it is compressed by simultaneous contact on either side by said roller means; said roller means comprising: a nip roller, a chill roller and a third roller, the process being further defined in that in the contacting of the heat fusible foam sheet the sheet is held flat and smooth on the surface of the nip roller before it is compressed by said roller means and said polymeric resinous material is fused into said heat fusible foam sheet as it is contacted therewith and subsequently compressed.

References Cited

UNITED STATES PATENTS

| | | | |
|---|---|---|---|
| 3,218,212 | 11/1965 | Underwood | 156—244 |
| 3,321,357 | 5/1967 | Kennedy | 156—244 X |
| 3,340,124 | 9/1967 | Lowe et al. | 156—244 |
| 3,389,036 | 6/1968 | Rudolph et al. | 156—244 |
| 3,421,964 | 1/1969 | Arbit | 156—244 |
| 3,459,625 | 8/1969 | Heller et al. | 156—244 |
| 3,462,290 | 8/1969 | Kresse et al. | 156—244 X |
| 3,470,055 | 9/1969 | Wade | 156—244 |
| 3,481,818 | 12/1969 | Wellen | 156—244 X |

CARL D. QUARFORTH, Primary Examiner

S. J. LECHERT, Jr., Assistant Examiner

U.S. Cl. X.R.

156—306, 322, 324, 494, 498